United States Patent [19]

Rhodes

[11] 4,346,990

[45] Aug. 31, 1982

[54] SCANNING AFOCAL LASER VELOCIMETER PROJECTION LENS SYSTEM

[75] Inventor: David B. Rhodes, Yorktown, Va.

[73] Assignee: The United States of America as represented by the Administrator of the National Aeronautics and Space Administration, Washington, D.C.

[21] Appl. No.: 73,477

[22] Filed: Sep. 7, 1979

[51] Int. Cl.³ .......................... G01P 3/36; G02B 3/00
[52] U.S. Cl. .................................... 356/28.5; 350/453
[58] Field of Search ................ 356/28.5; 350/212, 46, 350/47, 453

[56] References Cited

U.S. PATENT DOCUMENTS 3,860,342  1/1975  Orloff et al. ...................... 356/28.5
3,895,872  7/1975  Dandliker ......................... 356/28.5
4,167,329  9/1979  Jelalian et al. ..................... 356/28.5

Primary Examiner—S. C. Buczinski
Attorney, Agent, or Firm—Howard J. Osborn; John R. Manning; Wallace J. Nelson

[57] ABSTRACT

A method and apparatus for projecting and focusing parallel laser light beams from a laser doppler velocimeter on a target area. The system includes three lenses. Two lenses work together as a fixed afocal lens combination. The third lens is a movable scanning lens. Parallel laser beams travel from the velocimeter through the scanning lens and through the afocal lens combination and converge, i.e. are focused, somewhere beyond. Moving the scanning lens relative to the fixed afocal combination results in a scanning of the focus area along the afocal combination's optical axis.

5 Claims, 1 Drawing Figure

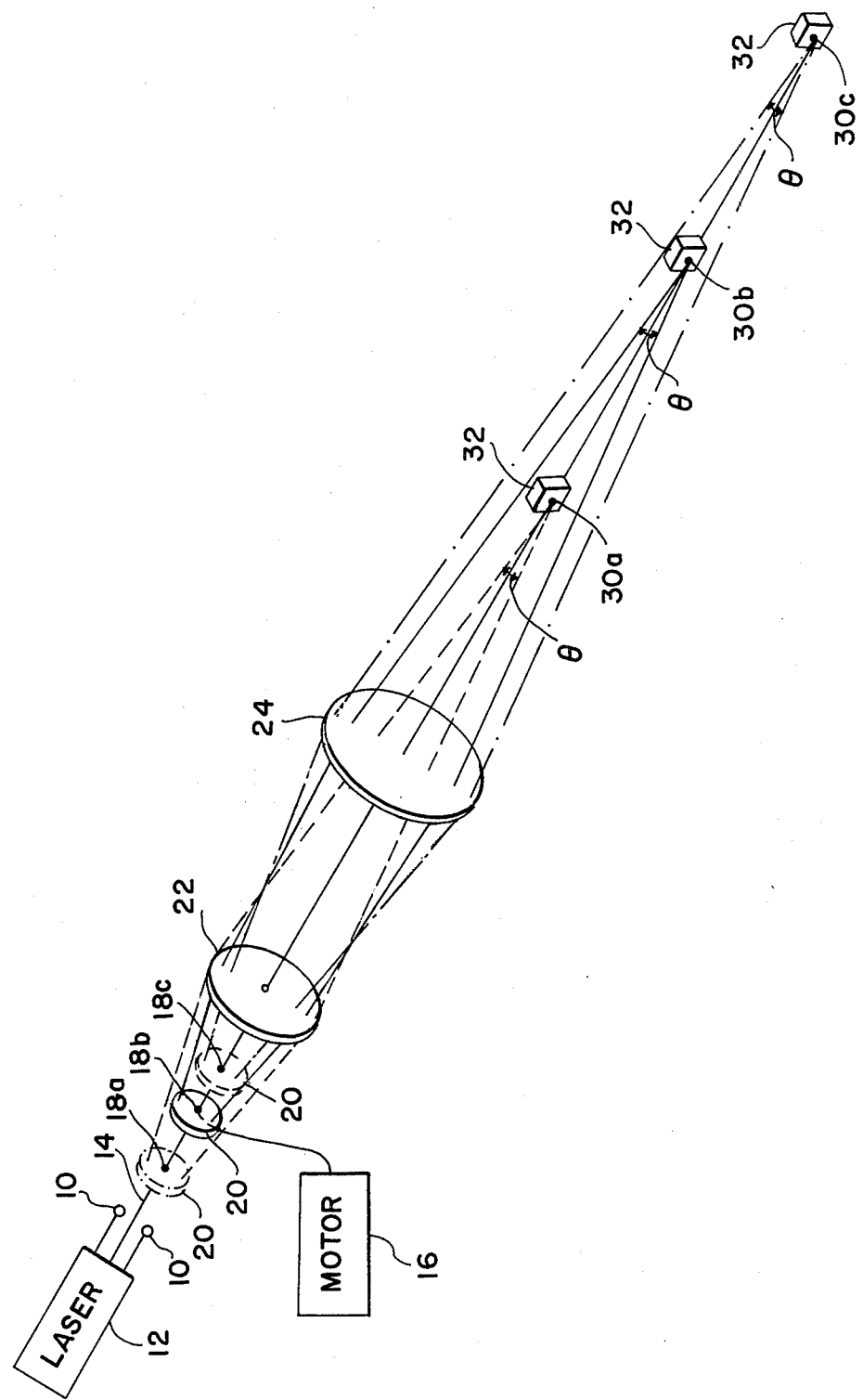

SCANNING AFOCAL LASER VELOCIMETER PROJECTION LENS SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to an optical scanner and more specifically concerns an optical scanner used in a laser velocimeter (LV) system incorporating an afocal lens system in combination with a movable scanning lens.

A variety of anemometers are in use for measuring the magnitude of fluid flow velocity in a wind tunnel. Among these are pitot tubes, hot wires and reference beam laser velocimeters. The reference beam laser velocimeter measures the doppler frequency shift induced in scattered light from a moving target object, such as a dust particle or smoke particle suspended in a fluid stream. The magnitude of doppler shift is indicative of the velocity of the target object and the fluid. This device is especially useful where fine resolution is desired as in the measurement of velocity in fluid boundary layers adjacent to model surfaces in wind tunnel tests. In the LV system parallel laser beams are focused by lenses to a sharp image where they intersect. Back scattered light from the small volume around the image intersection point, of focus point, is collimated by reverse transmission through the lens system.

When it is desired to vary the spatial location of the focus point some sort of scanning system must be employed.

There are a number of optical scanning systems in the prior art for focusing parallel LV laser beams at points in space. These devices effect a scan by either moving the focusing element or by employing a focusing element of variable focal length. The present invention utilizes an afocal lens combination and a movable scanning lens. An afocal lens combination is a pair of lenses positioned apart a distance precisely equal to the sum of their focal lengths making the focal length of the combination infinite. Two important characteristics of an afocal lens combination are, firstly, that light entering the combination at a given angle with respect to the optical axis of the system will leave the system at a given angle which is dependent only on the magnification of the afocal combination angle and, secondly, that the magnification of the afocal combination is equal to the ratio of the focal lengths of the lenses and is independent of the object distance. These characteristics when applied to the intersecting laser beams in an LV system result in a constant crossbeam intersection angle and constant focal volume dimensions. Herein lies the advantage of the invention over the prior art scanners utilizing focusing elements which inherently cannot maintain constant crossbeam angle and focal volume. If as in these systems, the crossbeam angle and the focal volume are not maintained constant, the doppler shift in the scattered light is dependent on the focal volume location as well as the velocity of the scattering particle and require calibration of equipment for each focal position.

The present invention requires no calibration for each focal position during a scan. In the invention, the parallel beams pass through the scanning lens, through the afocal lens combination and are focused somewhere beyond on the optical axis. Moving the scanning lens a distance, d, with respect to the afocal combination moves the focal volume the distance d times the square of the magnification of the afocal lens combination along the optical axis.

Herein lies the advantage of the invention over the prior art scanners utilizing a movable focus element alone to effect a scan. Such a system moves the target volume a distance equal to the distance the focusing element is moved or it moves the target volume nonlinearly with the focusing element whereas the present invention effects a long scan of constant magnification from a relatively short movement of the scanning lens.

An object of the present invention is a method and apparatus for focusing light beams at points in space.

A further object of the present invention is a method and apparatus for focusing light beams at various points in space at constant focal volume and constant crossbeam angle.

A further object of the present invention is a method and apparatus for focusing light beams at various points whereby the scanning distance is longer than the scanning lens movement distance.

A further object of the present invention is an apparatus yielding the foregoing advantages through the combination of an afocal lens combination and a movable scanning lens.

Other objects and advantages of the present invention will be readily apparent from the following description and drawing which illustrate the preferred embodiment of the invention.

SUMMARY OF THE INVENTION

The present invention involves a method and apparatus for focusing light beams at points in space with constant crossbeam angle and constant focal volume. Parallel light beams are passed through a movable scanning lens and then through an afocal lens combination to focus at some point on the optical axis. The scanning lens is translated along the optical axis with respect to the afocal combination thereby moving the beam focus position the same distance multiplied by the square of magnification of the afocal combination. A constant focal volume and crossbeam angle is maintained during the scan.

BRIEF DESCRIPTION OF THE DRAWING

The drawing is a schematic representation of the invention.

DETAILED DESCRIPTION OF THE INVENTION

Referring to the embodiment of the invention depicted in the drawing, the lenses 22 and 24 are an afocal lens combination being positioned apart a distance precisely equal to the sum of their focal lengths thereby making the focal length of the combination infinite. One characteristic of an afocal lens combination is that light entering the combination at a given angle with respect to the optical axis will leave the system at a given angle dependent only on the magnification of the afocal lens combination. The magnification of the afocal combination is equal to the ratio of the focal lengths of the lenses and is independent of the object distance. This constant or fixed magnification when applied to the intersecting lasers in an LV system results in a constant crossbeam intersection angle, $\theta$, and a constant focal volume 32. The focal volume 32 is the volume defined by the intersection of laser light beams 10.

Lens 20 is movable with respect to the stationary afocal combination along the optical axis 14 of the system by motor means 16, shown diagramatically for purposes of illustration. In operation of the invention parallel laser beams 10 emitted from laser velocimeter 12 travel through lens 20. Lens 20 is a diverging lens so that laser beams 10 diverge with respect to axis 14 as they leave lens 20. Biconcave, plano-concave and negative meniscus lenses are all diverging type lenses. In the preferred embodiment a biconcave lens is appropriate to diverge incoming parallel beams 10. Beams 10 then pass through the afocal lens combination consisting of lenses 22 and 24 and focus at a point along optical axis 14. A portion of the beam is then reflected back along the same path and received by the laser velocimeter 12.

When scanning lens 20 is at a position 18a on axis 14, the beams 10 will focus at a volume 32, due to the finite width of beams 10, around point 30a and will converge at an angle $\theta$. Moving lens 20 to position 18b results in a shift of the focal volume to point 30b on the optical axis 14. The focal volume remains constant and the beams 10 will still converge at angle $\theta$. The distance scanned between points 30a and 30b equals the distance between points 18a and 18b times the square of the magnification of the afocal lens combination.

Similarly, moving the scanning lens to position 18c, results in a shift of the focal volume to point 30c on the optical axis 14. Again, focal volume remains constant, angle of convergence, $\theta$, remains constant and the distance scanned equals the distance the scan lens 20 is translated times the square of the magnification of the afocal lens combination.

Lens 20 is not restricted to operation at stationary positions and may be moved continuously to provide a continuous scan along axis 14.

The above described description and drawing are only illustrative of one embodiment which achieves the objects, features, and advantages of the present invention and it is not intended that the present invention be limited thereto. Any modifications of the present invention which come within the spirit and scope of the following claims are considered part of the present invention.

What is claimed as new and desired to be secured by Letters Patent of the United States is:

1. An optical scanner for focusing light beams at points in space comprising:
   afocal lens means providing constant crossbeam angle, constant focal volume and constant magnification;
   scanning lens means having a common optical axis with said afocal lens means; and
   means for moving said scanning lens means along the optical axis relative to said afocal lens means to scan points in space.

2. An optical scanner as in claim 1 further comprising:
   emitting means for producing parallel light beams;
   receiving means for detecting light energy scattered back through the afocal lens combination and the scanning lens.

3. An optical scanner as in claim 1 wherein:
   said movable scanning lens is positioned such that said light beam will pass therethrough;
   said afocal lens combination is positioned such that said light beams will pass therethrough after emerging from said movable scanning lens to focus upon points in space.

4. An optical scanner as in claim 2 or claim 3 wherein said emitting means and said receiving means comprise a laser doppler velocimeter.

5. A method for scanning focused light beams at points in space at a constant crossbeam angle and constant focal volume comprising the steps of:
   providing an afocal lens combination;
   providing a movable scanning leans being movable along the optical axis of said afocal lens combination;
   providing parallel light beams;
   arranging the afocal lens system to obtain constant lateral magnification of the parallel light beams along the optical axis, constant crossbeam angle at any scanning point, and constant focal volume;
   providing means for moving said movable scanning lens;
   shining said light beams through said movable scanning lens to emerge therefrom and pass through said afocal lens combination to emerge therefrom and focus upon a point in space along the optical axis at said afocal lens combination; and
   moving said movable scanning lens with respect to said afocal lens combination to scan the point of convergence of said light beams along the optical axis.

* * * * *